(12) United States Patent
Barber et al.

(10) Patent No.: US 10,980,253 B2
(45) Date of Patent: Apr. 20, 2021

(54) COMPOSITION, SYSTEM AND METHOD FOR PELLET OR FLAKE PRODUCTION

(71) Applicant: GLOBAL EARTH SOLUTIONS, LLC, Las Vegas, NV (US)

(72) Inventors: Guyon Barber, La Quinta, CA (US); Jerry Coates, Salt Lake City, UT (US)

(73) Assignee: Global Earth Solutions, LLC, Las Vegas, NV (US)

( * ) Notice: Subject to any disclaimer, the term of this patent is extended or adjusted under 35 U.S.C. 154(b) by 49 days.

(21) Appl. No.: 15/934,950

(22) Filed: Mar. 24, 2018

(65) Prior Publication Data

US 2019/0200643 A1 Jul. 4, 2019

Related U.S. Application Data

(60) Provisional application No. 62/611,266, filed on Dec. 28, 2017.

(51) Int. Cl.
| | | |
|---|---|---|
| *A23K 40/10* | (2016.01) | |
| *A23K 20/163* | (2016.01) | |
| *A23K 20/111* | (2016.01) | |
| *A23K 20/105* | (2016.01) | |
| *A23K 50/30* | (2016.01) | |
| *A23K 10/37* | (2016.01) | |
| *A23K 10/26* | (2016.01) | |

(Continued)

(52) U.S. Cl.
CPC ............ *A23K 40/10* (2016.05); *A23K 10/26* (2016.05); *A23K 10/37* (2016.05); *A23K 20/105* (2016.05); *A23K 20/111* (2016.05); *A23K 20/163* (2016.05); *A23K 40/25* (2016.05); *A23K 50/30* (2016.05); *A23K 50/75* (2016.05)

(58) Field of Classification Search
None
See application file for complete search history.

(56) References Cited

U.S. PATENT DOCUMENTS

| | | | |
|---|---|---|---|
| 1,916,403 A | * | 7/1933 | Atkinson ............... A61K 8/922 424/58 |
| 4,034,120 A | | 7/1977 | Wortham et al. |

(Continued)

FOREIGN PATENT DOCUMENTS

| | | | | |
|---|---|---|---|---|
| DE | 19955844 | | 11/1998 | |
| SE | 8701046 A | * | 9/1988 | ............... A23K 1/16 |
| WO | WO-2016120221 A1 | * | 8/2016 | ............... A23L 2/60 |

OTHER PUBLICATIONS

Hinkle, et al. "Of Beer, Leather, and Beets—A study of alternative binders in agitation pellletizing". Published in 1991, 22nd Inst. Briquetting and Agglomeration, Bienniel Conf. 22:131-142. Available on http://marsmineral.com/library. (Year: 1991).*

(Continued)

*Primary Examiner* — Jenna A Watts
(74) *Attorney, Agent, or Firm* — Dentons Durham Jones Pinegar; Sarah W. Matthews

(57) ABSTRACT

An additive for use in pelletizing or flaking a feedstock is disclosed. The additive may comprise about 25-80% by weight glycerin and about 20-75% by weight reverse osmosis water. A method is also disclosed, including disposing feedstock in a conditioning chamber, injecting the additive to lubricate the feedstock, and pelletizing the feedstock. The additive may also be used in flaking.

16 Claims, 6 Drawing Sheets

(51) Int. Cl.
*A23K 40/25* (2016.01)
*A23K 50/75* (2016.01)

(56) References Cited

U.S. PATENT DOCUMENTS

| | | | |
|---|---|---|---|
| 5,211,980 | A | 5/1993 | Cox |
| 5,328,497 | A | 7/1994 | Hazlett |
| 6,063,364 | A * | 5/2000 | Makos .................... A61K 8/36 |
| | | | 424/49 |
| 9,956,563 | B1 | 5/2018 | Roa-Espinosa et al. |
| 2004/0115288 | A1* | 6/2004 | Sadeghi ............... A61K 36/185 |
| | | | 424/750 |
| 2006/0260508 | A1 | 11/2006 | Bailey |
| 2008/0045464 | A1 | 2/2008 | Kannar et al. |
| 2009/0056940 | A1 | 3/2009 | Minnich et al. |
| 2013/0186303 | A1 | 7/2013 | Budina |
| 2013/0224127 | A1 | 8/2013 | King et al. |
| 2015/0030752 | A1 | 1/2015 | Omernik et al. |
| 2015/0079262 | A1 | 3/2015 | Spratt |
| 2017/0339982 | A1 | 11/2017 | Vinokur |
| 2018/0014565 | A1* | 1/2018 | Toksoz .................... A23L 2/60 |

OTHER PUBLICATIONS

"What is the Difference Between Reverse Osmosis Water and Distilled Water?". Available Aug. 4, 2011 at www.freedrinkingwater. com. pp. 1-2. (Year: 2011).*

Arbor Organic Technologies, "Natural Organic Products". Version 19: Jun. 11, 2012. pp. 1-4. (Year: 2012).*

Saska. "Antioxidants and Other functional extracts from sugarcane". Mar. 2005, Asian Functional Foods, Chapter 18, E1. (Year: 2005).*

Derwent Abstract for SE 8701046 to Lindeberg. Published Sep. 14, 1988, p. 1. (Year: 1988).*

Mar. 25, 2019 Search Report & Written Opinion PCT ISA 220 from related pending PCT case PCT/US18/67502.

Zajic, Lovorka, "The Use of Surface Energy Values to Predict Optimum Binder Selection for Granulations." International Journal of Pharmaceutics 59.2 (Mar. 20, 1990) 155-164. Mar. 20, 1990, 155-164.

* cited by examiner

COMPOSITION, SYSTEM AND METHOD FOR PELLET OR FLAKE PRODUCTION

BACKGROUND

Field of the Art

The present invention relates to a composition, system and method for improving pellet production and/or flake production. More specifically, the present invention relates to an additive to be added to material being formed into pellets or flakes, a system for creating the pellet or flake and a method for improving the qualities of the pellets or flakes produced.

State of the Art

There are a wide variety of compositions which are formed into pellets or flakes to improve their usefulness. For example, wood can be chipped or ground into small pieces and then either formed into pellets or combined with other material (such as paper or other combustibles) and formed into pellets. The compacted material is then used as a heat source in pellet burning stoves or in power plants to generate electricity and/or generate steam for heating buildings and the like. The wood pellets generally produce more heat than simply burning regular logs and create less carbon dioxide and other pollutants than does the burning of coal. Moreover, wood pellets are a renewable resource and the growth of the trees for wood pellets consumes carbon dioxide generated in the burning of the pellets. Thus, several countries have actively steered their energy production efforts toward the use of wood pellets over other forms of fuel.

Another area in which pellets have seen a significant increase in popularity is in fertilizer. While historically farmers and others have used liquid fertilizers on their plants, it has been found the liquid fertilizers are highly mobile and can be quickly washed off the farm—potentially causing algae blooms in lakes and rivers—or pass through the soil and contaminate groundwater supplies. It has been found that pelletizing manure allows the manure to be applied to crops in a less environmentally damaging way. The pellets gradually break down with the application of water, rendering the fertilizer less mobile and allowing for time release of the fertilizer so applications can be less frequent. Thus the use of fertilizer pellets both save time and are viewed as being environmentally superior to the use of liquid fertilizers.

Yet another common use of pelletizing is the preparation of feed for livestock and pets. A single food source or a combination of food sources can be formed into a pellet. Pellets with multiple food sources are popular because they can provide more complete nutrition for the animal in a single feeding. For example, grains, proteins are other nutrients can all be added into a single feed pellet, thereby ensuring that the animal is eating the desired ratio of nutrients to ensure ideal growth.

Pellets are also popular because they reduce waste in the feed. If feed is provided to animals in its individual components, it can be wasted or the animal may not eat the desired combination of different nutrients. Grinding the feed may improve digestion of feed material which has a protective barrier (for example some seeds have a coating which inhibits digestion of the seed). Grinding the feed produces small pieces of feed called "fines" and dust.

Feeding an animal fines and dust, however, is difficult. Wind or other environmental conditions will cause the fines to blow away, and they are often more difficult for the animal to put into their mouths. Additionally, some animals will eat the pellets but will not eat the fines or dust even though it is the same material as the feed in the pellets. Thus, it is important that the pellets are formed so they stay in pellet form during shipping and use, but not be so hard that the animal cannot eat them.

The dust-like material which forms the pellets is problematic in other uses of pellets as well. If woods pellets do not remain pelletized, the wood dust is much harder to use for heat or electricity generation as it does not have the same burn qualities as the wood pellets. Additionally, wood dust (and many other types of dust) are highly flammable and can create safety concerns.

To address these concerns, pellets are rated on a Pellet Durability Index (PDI). A pellet with a low PDI is more likely to crumble and be of less use to the end user. The PDI is determined by weighing the pellets and then placing pellets in a tumbler or other vibrating machine for a set period of time. The fines and dust are then removed and the pellets are reweighed. The resulting weight gives the PDI of the pellets. Thus, for example, if 1 kg of pellets are placed in the machine and after being manipulated for 120 seconds the remaining pellets weigh 710 grams, the pellets have a PDI index of 71 (i.e., 71 percent of the material remains pelletized). If the PDI of the pellets are too low, the farmer or other purchaser may reduce the amount they are willing to pay for the pellets, or may refuse the shipment all together. This is because the farmer or other user will appreciate that roughly 29 percent of the feed he or she is buying is likely to be wasted.

Achieving a desirable PDI can be a challenge when making a pellet. The material from which the pellet is made will often having varying moisture contents. If the moisture content is too low, it is difficult for the material to stick together and hold as a pellet. If the moisture content is too high, the pellet may be more susceptible to mold and may stick to other pellets. When the pellets are completed they are generally at a high temperature and are cooled and dried to a desired overall moisture content in a shaker/cooler. By monitoring the moisture content of the pellets, the operator of the pelletizing machine can make adjustments earlier in the process to try and get pellets with just the right amount of moisture as the pellet comes out.

Two key factors in forming a pellet which has a good PDI are the temperature at which the pellet is formed and the moisture content. Cold material usually does not stick together well. Moist materials generally bond together better, but a high moisture content increases the time to cool the pellets and increases the risk of mold and other fouling of the pellets. Thus, maintaining an optimal heat/moisture balance is desirable in the pellet formation process.

One challenge presented by high levels of heat is that sap and other sticky materials within a plant are liquefied more readily at higher heat levels. Thus, while high heat levels make the pellets internally stick together better, they also release the plant fluids and cause the feed material to stick to the pelletizing equipment. Those pelletizing combinations of materials quickly learn the heat ranges in which pelletizing can occur. Exceeding that range for the feed stock used will often result in the equipment becoming gummed up with sticky feed material and require the pelletizing machine to be taken off-line and thoroughly cleaned. It is common for many mills to run at 145 degrees or less to prevent the feed stock from sticking to the pelletizing machine.

Likewise, running the pelletizing equipment at a high rate of speed increases heat and can cause the pellet dies, etc., to be clogged with sap or other plant material. For this reason, it is not uncommon in the industry for pellet producers to be running a machine capable of 15 tons per hour at less than 5 tons an hour to avoid clogging the equipment.

In addition to clogging the equipment, feed stock sticking to the equipment also increases wear on the equipment due to creating friction, and also can sear the outside of the pellet, interfering with moisture control and pellet desirability. A pelletizing die may cost in excess of $30,000 to produce. The increased wear on the die is a strong disincentive to running the feed stock at higher temperatures even though it could improve the quality of the pellets.

Yet another factor in the use of pellets is the nutritional value of the pellets. It has been found that running feed pellets at a high temperature can result in pellets having a higher available glucose content in the feed, with the heat causing some starches in the raw material to convert into sugars. The higher glucose content improves digestibility of contents of the pellets, as glucose is more digestible than starches, and enables animals to reach a desired size and weight more quickly. In animals raised for consumption, the higher glucose content pellets can reduce the time from birth to harvest by several days, thereby increasing profitability. For example, some hog farms raise approximately 1 million hogs at a time. If improved pellets can eliminate one day of feed per cycle at a cost of $1 per day per hog, the farm can save $1 million for the day earlier the hogs are ready for harvest. Likewise, if feed efficiency can be increased 2 points on 1 million birds (for example, 1.7 pounds of feed to 1 pound of meat being reduced to 1.68 pounds of feed per pound of meat), the 2 points improvement will save the grower $100,000 per cycle.

Attempts have been made to provide additives to reduce friction by injecting additives into feedstock. For Example, Save Our Earth Solutions sells binders and lubricating aids for feed, fertilizer and biomass producers. Save Our Earth Solutions additive solution is described in U.S. Patent Publication 2017/0339982A1. According to that publication, Save Our Earth's formula includes the following:
about 15% to 40% by weight glycerin,
about 0.005% to about 0.017% by weight guar gum,
about 0.009% to about 0.028% by weight gum Arabic,
about 0.005% to about 0.17% by weight aloe vera, and
the balance by weight being water.

The publication further teaches using additional additives such as about 0.06% to 0.18 percent by weight potassium sorbate; about 0.55% to about 2% by weight ascorbic acid; about 0.055% to about 0.2% by weight citric acid; and about 0.0055% to about 0.018% by weight tocopherol. The publication further teaches mixing the ingredients with 80 degree water. While the additive provides an improvement over conventional pelletizing process, a substantial improvement can be achieved by an alternate formula.

One issue which has been present with additives is mold. If not treated carefully, additives with glycerine can have mold grow in the mixture which is then mixed with the feedstock, potentially contaminating all of the feedstock and rendering it unusable. Several samples obtained showed noticeable mold grow within a few weeks and pellets formed using the additive developed noticeable mold within three weeks. In theory, if the conditioning chamber into which the additive is delivered is run at a sufficiently high temperature (i.e. greater than 180 degrees Fahrenheit), the temperature of the conditioning chamber should reduce and/or kill bacteria and mold spores and prevent them from contaminating the resulting pellets. Several factors, however, prevent the field application from matching theory. First, the conditioning chambers are fairly large. Many will hold several tons of feedstock being conditioned and some hold 10 tons or more. This can result in pockets of feed which are not properly subjected to sufficient heat if the contents are not held in the conditioning chamber for a substantial amount of time.

As an example, if six tons of feed is dispensed into the conditioning chamber and steam introduced to raise the temperature to 190 degrees Fahrenheit, it can take a substantial amount of time for all of the feed stock to reach 190 degrees. As the additive containing mold is introduced into the conditioning chamber, some clumps of the feed stock may receive the mold containing additive and then be advanced to the pelletizer, and the mold-laden feed stock is made into pellets containing active mold spores. Moreover, the mold spores can contaminate equipment downstream from the conditioning chamber. This can result in contaminated pellets. Over time the mold can spread to other pellets, potentially contaminating the entire batch.

Another problem with the theory that the conditioning chamber will kill the mold is that many people with pelletizing experience have been trained to keep the temperature of the conditioning chamber between about 135-145 degrees. Prior to the use of additives, such temperatures were maintained to ensure that the feedstock did not become too sticky prior to pelletizing. Due to their experience cleaning out a gummed up pelletizing machine, many with pelletizing experience are simply resistant to running at temperatures which are high enough to kill mold spores and bacteria. If the person performing the pelletizing runs the system with the conditioning chamber at 135-145 degrees and injects an additive containing mold spores, the entire batch of pellets may be impregnated with mold spores and be a complete loss.

To counter the risk of mold, attempts have been made to add acids which resist mold formation, such as ascorbic acid and citric acid. However, such materials are often not organic and can damage mild steel.

Thus, there is a need for a composition, system and/or method which will facilitate the production of pellets with one or more of the following: increased PDI of the pellets, reduced costs, reduced wear per ton on the equipment, and/or increased nutritional value in the pellets. It will be preferred if the composition is also mold resistant.

In addition to pelletizing feed for animal consumption, feedstock is often flaked for use by animals. For example, corn is turned into flakes that are easier for the animal to eat and which provide better control of moisture content. One challenge in the processing of feedstock in flaking is the feedstock sticking to the flaking equipment. This has become an increasing concern because many seeds and grains have been genetically modified to deter pest infestations. For example, corn has a waxy coating on the outside of the kernel to deter insects. When flaking the corn, however, the waxy coating sticks to the rollers, thereby reducing the run rates and increasing the wear on the equipment. Current technology to reduce the waxy coating sticking to the rollers involves using acids mixed into the water hydrating the corn prior to rolling. The acids, however, also create wear on the system—potentially etching stainless steel—and may otherwise be undesirable.

Thus, there is a need for a composition, system and method which can help improve the flaking process of feedstock to reduce wear on the flaking equipment and improve gelatinization of starches.

SUMMARY OF THE INVENTION

The following summary of the present invention is not intended to describe each illustrated embodiment or every possible implementation of the invention, but rather to give illustrative examples of application of principles of the invention.

One aspect the invention may include an additive which is added to the feedstock (collectively meaning the material being formed into pellets whether feed, fertilizer, wood, etc.) during the production process to reduce friction, increase quality and throughput utilizing less amps per ton per hour and reduce wear on the pelletizing equipment.

In accordance with another aspect of the present disclosure, lubricant injector systems are added to pelletizing systems to reduce sticking of the feedstock to the pelletizing equipment to create a pelletizing system which is more efficient than prior art systems.

In accordance with another aspect of the present disclosure, a method is disclosed which allows feedstock to be processed at a higher temperature with less amperage draw to reduce to energy needed to form pellets.

In accordance with another aspect of the present disclosure, a method is disclosed which allows feedstock to be processed at a higher temperature to increase the PDI of resulting pellets.

In accordance with another aspect of the present disclosure, a method is disclosed which allows feedstock to be processed at a higher temperature while reducing feedstock friction with the pelletizing equipment and thereby reducing wear on the equipment.

In accordance with another aspect of the present disclosure, a method is disclosed which allows a high rate of throughput on pelletizing equipment without clogging the equipment with feedstock.

In accordance with another aspect of the present disclosure, a composition and method are disclosed for improving the flaking process to thereby reduce processing time of the feedstock and reduce wear on flaking equipment.

In accordance with another aspect of the invention, a composition is provided which provides enhanced mold resistance.

In accordance with another aspect of the invention, a composition is provided with added mold resistance using organic ingredients.

In accordance with one aspect of the invention, the additive may include a formula having between about 20 and 75% by weight water which has undergone demineralization/purification by reverse osmosis; and 25-80% glycerine. Other additives may be included depending on the type of pellet or flake being made.

In accordance with one aspect of the invention, the water used in the mixture is subjected to reverse osmosis at around 100 degrees Fahrenheit prior to mixture to remove bacteria, mold spores and minerals. In one embodiment a natural formula made in accordance with the invention may include:
about 30-65% by weight water (100 degree reverse osmosis water);
about 25%-60% by weight glycerin;
about 0-4% by weight organic fruit juice (for example, 0-2% apple juice concentrate, 0-2% orange juice concentrate and/or 0-2% pomegranate rice solution);
about 0-0.002% by weight organic wheat grass;
about 0.001-0.01% by weight gum (0-0.01% guar gum and/or 0-0.01% gum Arabic) about 0-10% other additives. Other additives may include organic sugar cane extract, jojoba oil clear, aloe vera powder, orange juice concentrate, aloe rice solution, citric acid and ascorbic acid. By using strictly organic additives, an organic additive/lubricant is formed.

In accordance with one aspect of the invention it has been found preferable to keep the amount of gum at or about less than 0.01% by weight of the composition. While gum, both guar gum and gum Arabic, promotes binding of the pellets, it also tends to promote sticking of the feedstock to the pelletizing dies. To promote binding in the pellets, up to 4% by weight fruit juice or fruit juice content can be used. In addition to promoting binding, when used in feed pellets the fruit juice adds flavor to the pellets and promotes consumption by the livestock.

In accordance with one aspect of the invention, organic juice concentrates can us used to minimize gum content. For example, one presently preferred composition for a natural formula may be:
about 55-65% by weight water (preferably 100 degree reverse osmosis water);
about 25% to 35% by weight glycerine;
about 1% by weight organic apple juice concentrate;
about 1% by weight organic pomegranate rice solution;
about 0.002% by weight organic wheat grass;
about 0.003% by weight Arabic gum; and
about 0-17% by weight other additives.
The other additives may include organic sugar cane extract, jojoba oil clear, aloe vera powder, orange juice concentrate, aloe rice solution, citric acid and ascorbic acid.

Depending on the type of pellet being made, other formulations for the composition may be used. For example, an organic formulation of the invention may be, for example:
50-65% by weight water (100 degree reverse osmosis water);
25%-40% by weight glycerin;
0-2% by weight organic fruit juice (for example, 0-2% apple juice concentrate, 0-2% orange juice and 0-2% pomegranate rice solution);
0-1% by weight organic wheat grass;
0.1% by weight organic vinegar;
0-0.1% by weight Arabic gum; and
0-20% by weight other additives.
A more preferred formulation of the invention for certain applications may be:
60-65% by weight water (100 degree reverse osmosis water);
30-35% by weight glycerin;
0-2% by weight organic apple juice concentrate;
0-2% by weight pomegranate rice solution;
0-0.004% by weight organic wheat grass;
0-0.004% by weight organic vinegar;
0.002% by weight Arabic gum; and
0-8% by weight other additives.

It will be appreciated that each of the improvements obtained by the invention is an independent improvement over the prior art and no requirement should be read into any claim that other aspects of the invention are included other than what is expressly stated in the claim. Additionally, it will be appreciated that different formulations may be used for different types of pellets.

BRIEF DESCRIPTION OF THE DRAWINGS

Various embodiments and aspects of the present disclosure are shown and described in reference to the numbered drawings wherein.

Figure 1:
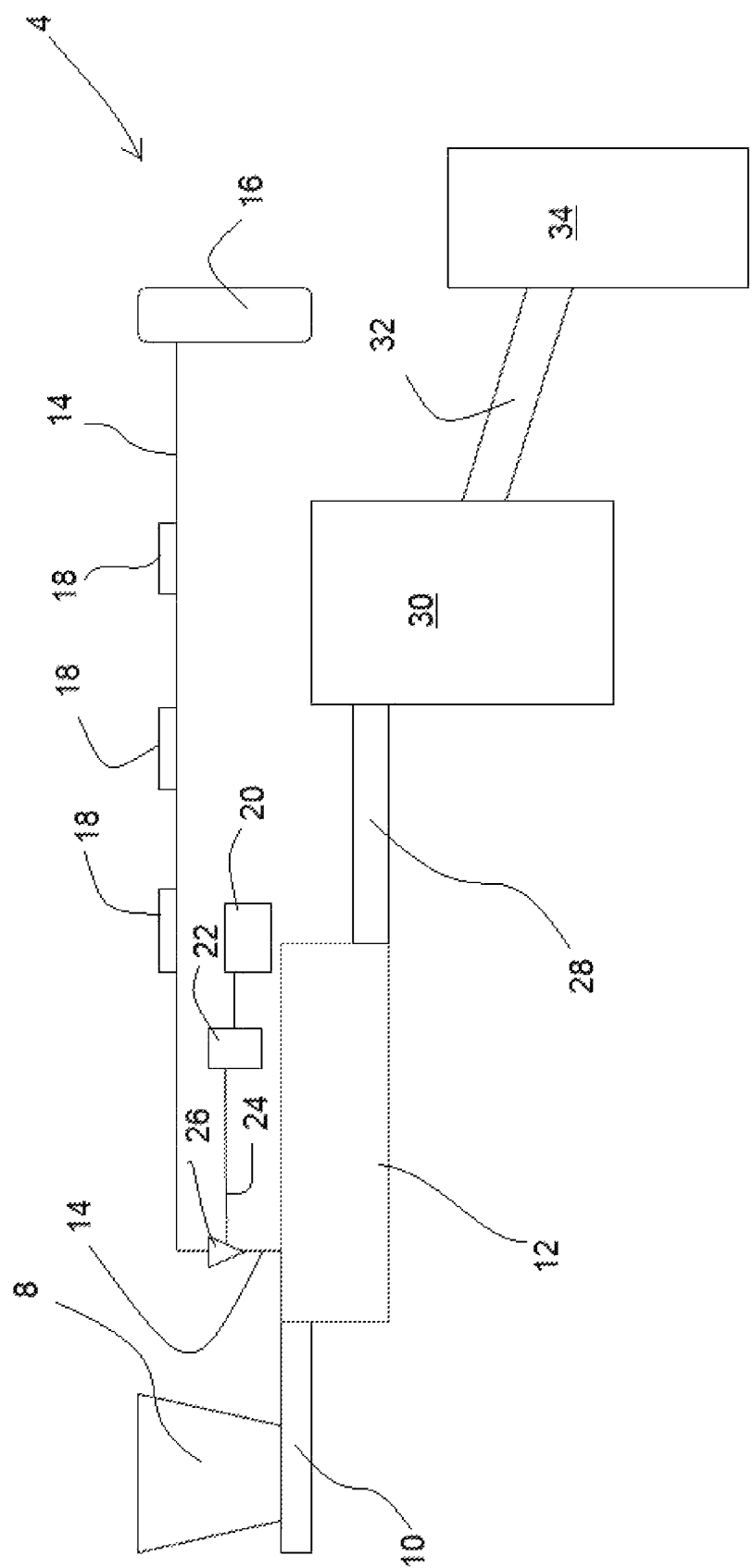
FIG. 1 illustrates a diagram of a pelletizing system formed in accordance with principles of the present invention.

It will be appreciated that the drawings are illustrative and not limiting of the scope of the invention which is defined by the appended claims. The embodiments shown accomplish various aspects and objects of the invention. It will be appreciated that it is not possible to clearly show each element and aspect of the present disclosure in a single figure, and as such, multiple figures are presented to separately illustrate the various details of different aspects of the invention in greater clarity. Similarly, not all configurations or embodiments described herein or covered by the appended claims will include all of the aspects of the present disclosure as discussed above.

DETAILED DESCRIPTION

Various aspects of the invention and accompanying drawings will now be discussed in reference to the numerals provided therein so as to enable one skilled in the art to practice the present invention. The skilled artisan will understand, however, that the methods described below can be practiced without employing these specific details, or that they can be used for purposes other than those described herein. Indeed, they can be modified and can be used in conjunction with products and techniques known to those of skill in the art in light of the present disclosure. The drawings and the descriptions thereof are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one embodiment," "one configuration," "an embodiment," or "a configuration" means that a particular feature, structure, or characteristic described in connection with the embodiment may be included in at least one embodiment, etc. The appearances of the phrase "in one embodiment" in various places may not necessarily limit the inclusion of a particular element of the invention to a single embodiment, rather the element may be included in other or all embodiments discussed herein.

Furthermore, the described features, structures, or characteristics of embodiments of the present disclosure may be combined in any suitable manner in one or more embodiments. In the following description, numerous specific details may be provided, such as examples of products or manufacturing techniques that may be used, to provide a thorough understanding of embodiments of the invention. One skilled in the relevant art will recognize, however, that embodiments discussed in the disclosure may be practiced without one or more of the specific details, or with other methods, components, materials, and so forth. In other instances, well-known structures, materials, or operations may not be shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect is required to be present apart from an express inclusion of that aspect in the claims.

It should also be noted that, as used in this specification and the appended claims, singular forms such as "a," "an," and "the" may include the plural unless the context clearly dictates otherwise. Thus, for example, reference to "a die" may include an embodiment having one or more of such dies, and reference to "the dryer" may include reference to one or more of such dryers.

As used herein, the term "substantially" refers to the complete or nearly complete extent or degree of an action, characteristic, property, state, structure, item, or result to function as indicated. For example, an object that is "substantially" enclosed would mean that the object is either completely enclosed or nearly completely enclosed. The exact allowable degree of deviation from absolute completeness may in some cases depend on the specific context, such that enclosing the nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "generally" refers to something that has characteristics of a quality without being exactly that quality. For example, a structure said to be generally vertical would be at least as vertical as horizontal, i.e. would extend 45 degrees or greater above horizontal. Likewise, something said to be generally circular may be rounded like an oval but need not have a consistent diameter in every direction.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

As used herein, "feedstock" means any material which may be formed into pellets or flakes, including but not limited feed, biomass, fertilizer, wood, manure, woodchips, combustibles, etc.

Turning now to FIG. 1, there is shown a diagram of a pelletizing system, generally indicated at 4, formed in accordance with principles of the present invention. It will be appreciated that the embodiment described is typical for some types of pelletizing systems, but that other systems will lack some of the components described and may have additional components not described. Unless otherwise indicated, the present invention is not tied to a particular formation of the pelletizing system.

The pelletizing system 4 may include a hopper 8 for receiving the feedstock for the pellets. It will be appreciated that as used herein feedstock references the ingredients used to make a pellet, and not simply feed materials for animal. Thus, feedstock can include manure for fertilizer pellets, woodchips and other combustibles for wood pellets and virtually any other material used in making a pellet.

Once the feedstock has been placed and mixed to any desired extent in the hopper 8, the feedstock may be passed by a conveyer 10 to a conditioning chamber 12. Depending on the ingredients being used, the conveyer can be a traditional conveyor belt, a screw conveyer, or simply a slide which conveys the feedstock to the conditioning chamber.

The conditioning chamber 12 mixes the ingredients together. This is typically done under heat to make the feedstock more able to bind together and form a pellet which is capable of enduring vibration and impact as it is transported to the point of use. To this end a steam line 14 may be disposed in communication with the conditioning chamber 12 in order to heat the feed stock while it is being mixed. The steam injected into the conditioning chamber 12 may be formed in a steam generator 16. However, because putting moist steam into the conditioning chamber is likely to result in wet feedstock which may not stick together well and may have too high of a moisture content, a plurality of water traps 18 may be placed along the steam line to remove excess moisture from the steam.

In accordance with one aspect of the invention, a lubricant may be injected into the feedstock being mixed in the conditioning chamber 12. This is typically done by a container of the lubricant 20 being attached to a pump 22. The pump 22 passes the lubricant through tubing 24 into a dispenser 26 (such as a quill) disposed in the feed line. While ordinarily putting liquid into the steam line 14 would be viewed as a negative due to the potential to cause the feedstock to clump or get overly moist, it has been found that adding between 0.5 and 6 ounces of the lubricant per ton of feedstock can significantly improve the pelletizing process. It is believed that a currently ideal amount of lubricant for softer materials, such as animal feed and fertilizer is between about 0.5 and 2 ounces per ton, with about 1 ounce being the presently preferred amount. For harder materials such as wood chips, it is believed that a range of 1-4 ounces per ton, with the presently preferred range being about 2 to 4 ounces per ton.

The lubricant is carried by the feedstock as it passes out of the conditioning chamber 12 and through a conveyer 28 (if used) that carries the feedstock to the pelletizer 30. In the pelletizer 30 the feedstock is forcefully driven into a die (not shown in FIG. 1) having hundreds to thousands of holes. The feedstock in the holes is forcefully compressed to form pellets and then ejected from the holes. The warm, moist pellets may then be carried by a conveyer 32 or gravity to a cooler/shaker 34 where the pellets are cooled and dried until the moisture content is within desired ranges. Adjustments can be made along the steam line 14 to help ensure that the moisture is within desired ranges.

In accordance with the present invention, it has been found that the lubricant tends to bond with the surface of the dies used to make the pellets and prevent the feedstock material from sticking to the dies in the pelletizer 30. This has several significant benefits. First, the lubricant bonding to the dies substantially reduces friction. This makes the pelletizer much quieter (a significant advantage as many pelletizers are so loud as to create a risk to hearing of those operating them) and reduces the amperage draw of the machine. In other words, the amount of energy used per ton of pellets is significantly reduced, thereby saving money. Within 15 minutes of adding the lubricant to the feed stock, there has been a drop in the amperage draw of up to 40 percent. In other words, the pelletizer 30 is able to form the pellets while doing less work because of the decreased friction. This saves motor life and results in a substantial savings in electricity.

The reduced friction due to the lubricant bonding to the dies and other parts of the pelletizer is also significant because it enables the pelletizer to be run at a higher rate of speed without increasing the risk of the pelletized feedstock becoming jammed with the feedstock being made into pellets. Because the risk of the pelletizer getting jammed, pellet making systems are often run at substantially below their rated tonnage. For example, a 15 ton per house pelletizer is often run at 3-4 tons per hour to ensure that the pelletized does not get clogged. When using the lubricant of the present invention, however, it has been found that the same machine can operate at least 50 percent faster and often 100 percent faster without increasing the risk of the pelletized feedstock becoming jammed. By increasing the output per machine by 50 to 100 percent, the company making the pellets can substantially reduce their equipment costs. Moreover, early tests suggest that due to the reduced friction between the dies and the pellets, the dies will likely last longer, further increasing savings.

The single biggest benefit to the use of the lubricant, however, is that the system can be run at high temperatures. For example, many pelletizing systems are run with the feedstock being heated to about 135-145 degrees Fahrenheit. Beyond that temperature the feedstock tends to get sticky and is more likely to gum up the pelletizer. With the addition of the lubricant discussed below, it has been found that a system that ordinarily is heated to less than 145 degrees can be heated to approximately 180 degrees Fahrenheit without clogging the pelletizing machine.

Running the feedstock at 200 degrees or more has several benefits. First, at 200 degrees the feed stock becomes stickier. The feedstock bonds together better when pelletized. It has been found that simply increasing the temperature to 180 degrees provides a significant improvement in the PDI of the pellets. For example, on one test system, pellets run at 145 degrees had a PDI of 70, while pellets made from the same materials at 180 degrees had a PDI 92. While ordinarily the stickier feedstock would clog the machine, it has been found that the lubricant bonding to the die inhibits clogging at the higher temperature.

Another advantage of running the feedstock at higher temperatures is that in feed pellets it has been found that the heat helps bring out the sugars or glucose in the feed. The feed pellets produced at higher temperatures had higher glucose readings. By using feed with higher glucose, animals grow more quickly and are ready for harvest at an earlier date. For example, in order to mature to a certain desired weight, one breed of chickens normally requires 45 days. Eating pellets made from the same material, but run at the higher temperatures discussed above, allowed the chickens to reach the desired weight in 43 days. A reduction of approximately 4.4 percent, amounting to a substantial profit increase.

Finally, it has been found that heating the feed stock to about 180 and above degrees reduces, and in some cases eliminates, the need for mold inhibitors to be added to the feedstock to ensure that the pellets do not mold before being fed to the animals.

Figure 2:
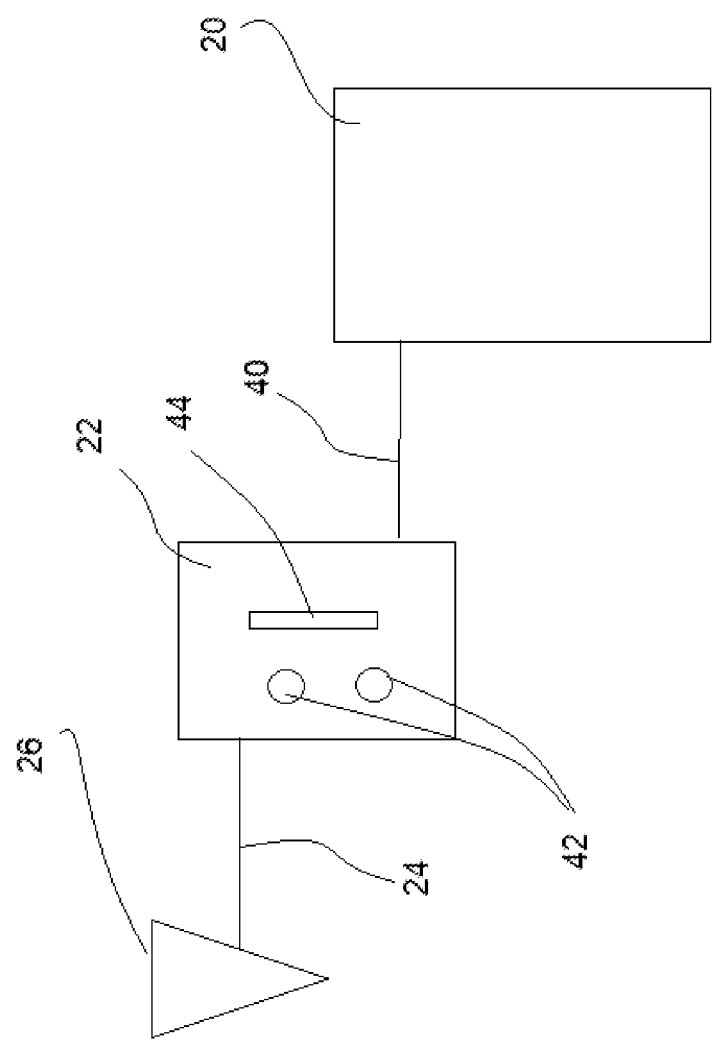
FIG. 2 shows a close-up view of a lubricant injection system which may be used to inject lubricant in accordance with the present disclosure.

Turning now to FIG. 2, there is shown a diagram of the lubricant injection system. The lubricant may be contained in a container 20 and may be drawn through a line 40 into the pump 22. The pump 22 may include controls 42 for controlling the rate at which the lubricant is added. It may also include a volume indicator 44 for displaying the amount of lubricant which has been injected over a period of time.

Figure 3:
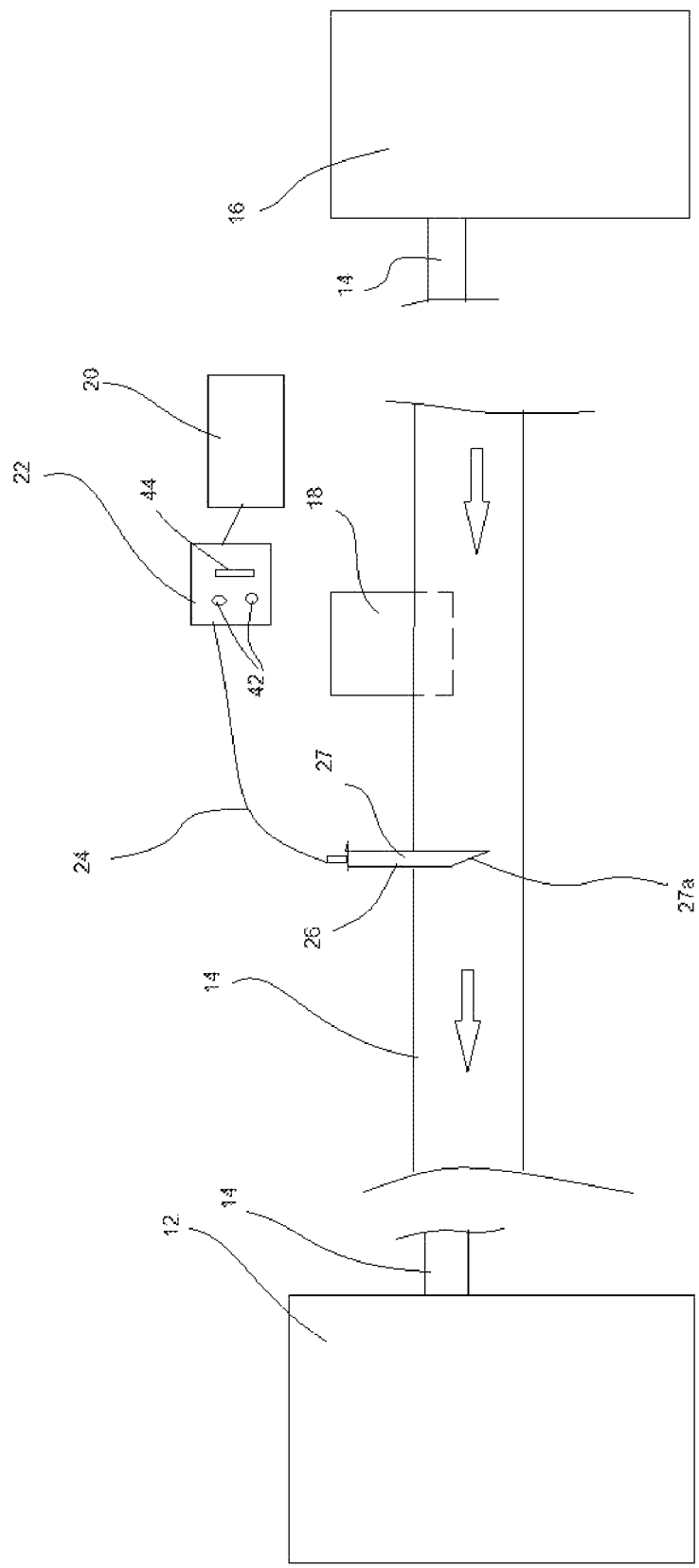
FIG. 3 show a fragmented, close-up view of the quill used to entrain the lubricant mixture in the steam system.

FIG. 3 show a fragmented, partial close-up view of a representative example of the dispenser 26 that may be placed along the steam line 14. The dispenser 26 may include a quill 27 which is disposed along the steam line. The quill dispenses a small quantity of the additive into the steam line 14 calculated so that about 0.5-6 oz. of additive is added per ton of feedstock being processed. More preferably, 1-2 oz. of additive is added depending on the material being pelletized. Remarkably it has been found that such a small amount can sufficiently lubricate the dies to process the feedstock at higher temperatures, with faster throughput and with less sticking of feedstock to the dies. This reduced energy consumption, increases productivity and results in pellets have a better PDI.

The quill 27 has an open face 27a through which the additive is dispensed into the steam line 14. The face 27a is faced down stream so that the incoming steam does not inhibit release of the additive. It will be appreciated that the passing steam can essentially atomize the additive to promote distribution throughout the feedstock.

Figure 4:
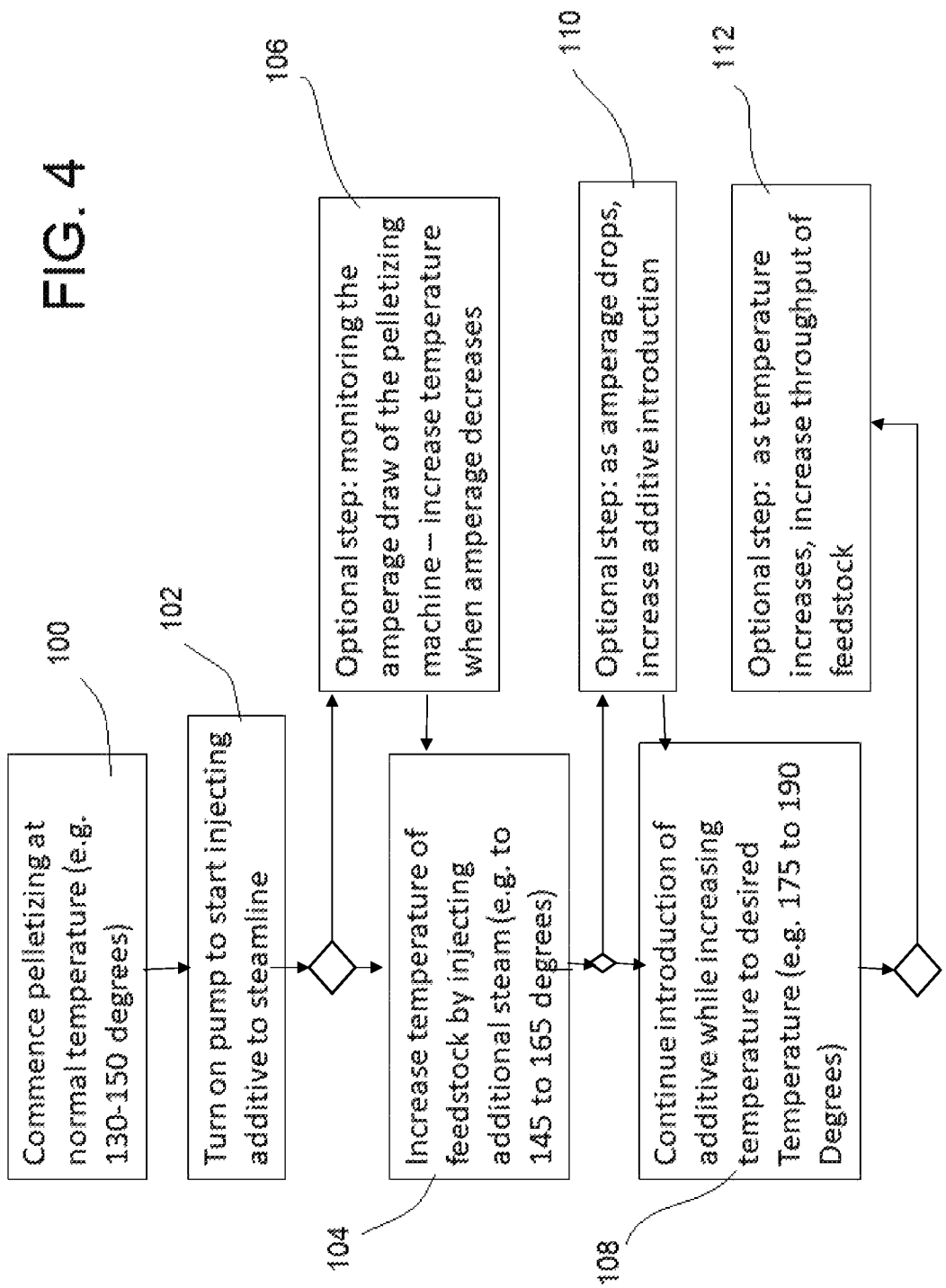
FIG. 4 shows a flow chart showing a representative example of the method of making a pellet in accordance with the present invention.

FIG. 4 shows a flow chart of a representative example of the method of making a pellet in accordance with the present invention. The pelletizing process may be commenced in a conventional manner. For example, when preparing feed pellets the process may commence by mixing the feed in the hopper 8 and then using the conveyer 10 to move the feedstock into the conditioning chamber 12. While the feedstock is being mixed in the conditioning chamber, it is heated to between about 130 and 150 degrees Fahrenheit (most commonly between about 135 and 145 degrees) as indicated at 100.

Once the feedstock reaches the target temperature range for normal pellet formation, the additive pump may be turned on to start injecting additive into the steam line as indicated at 102. This may occur after some pellets have been formed, or may commence just before pelletizing occurs.

The pelletizing process may commence and run for a period of time and then the temperature of the feedstock is increased to a higher than normal temperature, as indicated at 104 by injecting more steam. This may be done simply by waiting a predetermined amount time that is expected that enough additive has been applied to the working surfaces of the pelletizer or, as indicated at optional step 106, the temperature increase can be done in response to an amperage drop in the pelletizing machine—indicating that the additive is coating the die and reducing friction.

The additive is continually added while increasing the temperature to a desired range, such as 175 to 225 degrees, as indicated at 108. It will be appreciated that the amount of additive may start out at a rate less than the optimal rate to prevent excess moisture while the die and other working parts of the pelletizer are coated with the additive. Once these parts are adequately coated (as indicated by the passage of time or by amperage drop in the pelletizer as indicated at 110), the amount of additive can be increased, thereby allowing additional temperature increases in the feedstock by increasing steam introduction from the steam line.

Additionally, as the temperature increases and the additive is added at its desired rate, the speed of the feed auger can be increased as indicated at optional step 112. In experiments it has been found that instead of the amperage increasing with temperature common in conventional penalizing, once the full dose of additive is being added, the amperage will actually fall or remain steady as the temperature increases. Thus, it has been found that approximately 30 percent more pellets can be produced with the same or lower electricity consumption at the higher temperature. Noise is also reduced and throughput can be increased from 30% to 100%.

Multiple different formulations of the additive of the present invention may be made depending on the desired use. For example, one formula used for making a closeup (mineral) pellet is:

Closeup pellet (mineral Pellet) (by weight) may be made with:
about 20-35% by weight glycerin
about 0.1-3% by weight pomegranate rice solution (organic)
about 0.005-0.01% by weight organic pulp free orange juice concentrate
about 0.1-2% by weight aloe rice solutions (organic)—1%
about 0.001-0.005% by weight arabic gum, and
about 63-78% by weight water.
A currently preferred composition for closeup pellets is:
about 24% by weight glycerin (vegetable based)
about 1% by weight pomegranate rice solution (organic)
about 0.0073% by weight organic pulp free orange concentrate
about 1% by weight aloe rice solutions (organic)—1%
about 0.002% by weight arabic gum
about 73.9907% by weight water (Reverse Osmosis at 100 degrees)
Despite the abrasive nature of pellets and the difficulty in getting mineral pellets to bind, the above-referenced formula improved throughput and reduced noise while using relatively low amounts of glycerine and gum. The data in Example 7 below indicate the results for forming mineral pellets using 1 oz. of the above additive formula per pound of stockfeed (stockfeed is J. D. Heiskell mineral pellet, proprietary formula), compared to the additive known in the art. Notably, PDI of the formed pellets using the current formula is 96 after 90 minutes, while PDI using the additive known in the art is only 89 after 90 minutes.

The formulation of protein pellets also creates challenges and can cause considerable friction on the pelletizing equipment. A representative formula for making protein pellets includes:
about 52-65% by weight glycerin
about 0.001-0.01% by weight guar gum
about 0.001-0.01% by weight organic pulp free orange concentrate
about 0.001-0.01% by weight organic apple juice concentrate
about 0.1-4% by weight organic sugar cane extract
about 33-46% by weight water A presently preferred composition for making protein pellets is:
about 57% by weight glycerin (vegetable based)
about 0.006% by weight guar gum
about 0.0073% by weight organic pulp free orange concentrate
about 0.0073% by weight organic apple juice concentrate
about 2% by weight organic sugar cane extract
about 40.979% by weight water (Reverse Osmosis at 100 degrees)

Pellets for making feed for hogs and chickens often includes a high corn content and a large amount of soybean meal. For example, pellets are commonly made with about 50-65% by weight corn and 15-30% by weight soybean meal. Other seeds or fillers are often included. A formula for making hog and chicken feed pellets may include:
about 30-45% by weight glycerin
about 0.0001-0.01% by weight arabic gum
about 0.0001-0.0010% by weight organic apple cider vinegar
about 0.1-2% by weight organic sugar cane extract
about 0.1-2% by weight organic aloe rice solution
about 0.001-0.01% by weight organic pulp free orange concentrate
about 0.0001-0.001% by weight organic wheatgrass rice solution
about 0.0001-0.001% by weight organic pomegranate rice solution
about 53%-67% by weight water.

A currently preferred formulation used for making hog and chicken feed includes:
about 30-45% by weight glycerin (vegetable based)
about 0.001% by weight arabic gum
about 00045% by weight organic apple cider vinegar
about 1% by weight organic sugar cane extract
about 1% by weight organic aloe rice solution
about 0.00730% by weight organic pulp free orange concentrate
about 0.0004% by weight organic wheatgrass rice solution
about 00045% by weight organic pomegranate rice solution
about 62.98635% Reverse Osmosis Water heated to 100 degrees F.

The addition of the organic sugar cane extract and orange juice concentrate provides a pellet with flavor which is well received by the animals and which had a high PDI, while at the same time using approximately $1/14^{th}$ or less of the amount of gum identified in Save Our Earth's application.

In contrast to chickens and pigs, horses typically eat pellets in which alfalfa, or grasses such as Bermuda or Timothy grass are major ingredients. Common ranges for alfalfa are 25-100%, Bermuda grass 20-50% and Timothy grass 20-50%. A formulation for making horse pellets may include:
about 30-50% by weight water
about 0.0001-0.001% by weight organic apple cider vinegar
about 0.1-2% by weight organic apple juice concentrate
about 0.1-2% by weight organic sugar cane extract
about 0.1-2% by weight organic pomegranate rice solution
about 0.0001-0.001% by weight organic wheat grass rice solution
about 0.00001-0.001% by weight Arabic Gum
about 0.0001-0.001% by weight Guar Gum
about 1% by weight organic aloe rice solution
about 46-65% glycerin As with the hog and chicken feed, the formulation of the present invention allows substantially less gum while maintaining a high PDI for the resulting pellets. A presently preferred formulation for making horse pellets is:
about 40% by weight water (Reverse Osmosis heated to 100 degrees F.)
about 0.0009% by weight organic apple cider vinegar
about 1% by weight organic apple juice concentrate
about 1% by weight organic sugar cane extract
about 1% by weight organic pomegranate rice solution
about 0.00045% by weight organic wheat grass rice solution
about 0.0001% by weight Arabic gum
about 0.0003% by weight guar gum
about 1% Organic Aloe Rice Solution
about 55.998% glycerin (vegetable based)

The formulation for pellets for broiler, turkeys and ducks also differs from that commonly used for hogs and chickens. A formulation for making pellets for broilers, turkeys and ducks may include:
45-60% by weight glycerin
0.1-2% by weight vinegar
0.1-4% by weight sugar cane extract
0.1-2% by weight pomegranate rice solution
0.1-2% by weight wheat grass rice solution
0.1-1% by weight aloe rice solution
34.5-50% by weight water A presently preferred formulation for use during the making of pellets for broilers, turkeys and ducks includes:
50% by weight glycerin (vegetable based)
1% by weight vinegar
2% by weight sugar cane extract
1% by weight pomegranate rice solution
1% by weight wheat grass rice solution
0.5% by weight aloe rice solution
44.5% by weight water (reverse osmosis at 100 degrees)

The feed pellets so make have a high PDI without requiring any gum. Additionally, the sugar cane extract helps to elevate the sugar levels which can increase the speed at which the birds reach the desired harvest weight.

While feed pellets are an important part of the pellet industry, wood pellets have become increasingly important as attempts are made to move away from coal and other non-renewable resources. While burning of wood gives off carbon dioxide, the growth of trees consumes carbon dioxide. Thus, it is believed that burning wood has a less detrimental effect on the environment. Moreover, it has been found that wood pellets can increase the BTUs given off while decreasing pollutants.

A formulation for making would pellets may include:
about 25-35% by weight water
about 0.1-10% by weight polysaccharide brewex polysaccharide brewex is an organic, modified starch and generally considered a waste production of beer, the polysaccharide brewex used in these formulas was acquired from Reade Int'l Corp., 4894 Sparks Blvd., Ste. 107, Sparks, Nev. 89436).
about 0.1-2% by weight lignosulfonates
about 2-10% by weight sugar cane extract about 1-4% by weight wheat grass rice solution
about 55.5-65.5% by weight glycerin It will be appreciated that pelletizing wood presents many unique challenges.

For example, many wood pellet mills do not heat the wood shavings prior to pelletizing. This creates substantial friction and sound to the point where some mills are so loud that the walls literally shake and carrying on a conversation is next to impossible. Moreover, many mills will run at a fraction of the throughput (often 10-20%) for which the pelletizer is rated because of the friction and vibration.

A currently preferred formation for use in pelletizing wood products includes:
about 30% by weight water (reverse osmosis at 100 degrees F.)
about 2% by weight polysaccharide brewex (acquired from Reade Int'l Corp., 4894 Sparks Blvd., Ste. 107, Sparks, Nev. 89436).
about 0.5% by weight lignosulfonates
about 5% by weight sugar cane extract
about 2% by weight wheat grass rice solution
about 60.5% by weight glycerin Samples of wood pellets made using the additive formula in the preceding paragraph show a gain in BTUs (British Thermal Units) of approximately 10-25%. The throughput on the pelletizing machines have been increased 10-60% percent depending on the conditioning process and the noise created by the machines was reduced by 30-35% on average.

The use of the additive with wood pelletizing will depend on the configuration of the pelletizing equipment. For those facilities which lack steam injection into the conditioning chamber (often called a hog) where the wood shavings/grindings are further pounded, the additive can be added into the conditioning chamber. It has been found that the manipulation of the wood in the hog helps the additive to penetrate the exterior layer of the wood and act as a lubricant. When no conditioning chamber is used, the additive may be simply sprayed on the wood chips/shavings.

One advantage of many of the formulations discussed above is that they are sufficiently organic that the pellets made using the additive are considered organic so long as the feed stock does not include non-organic material. This improves the marketability of the pellets over other systems which result in pellets which cannot be certified as organic.

Figure 5:
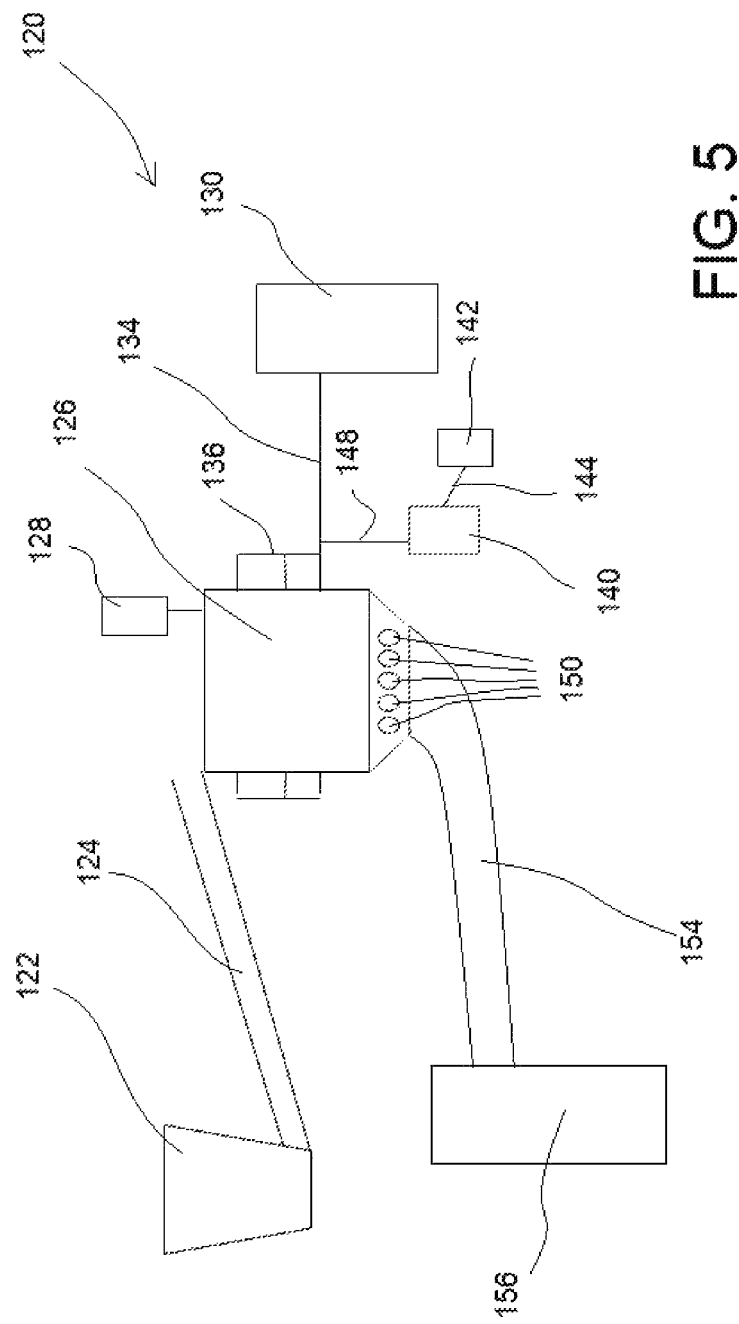
FIG. 5 shows a diagram of a flaking system formed in accordance with the principles of the present invention.

FIG. 5 shows a diagram of a flaking system, generally indicated at 120, formed in accordance with principles of the present invention. The flaking system includes may include a hopper 122 for holding corn or some other grain and a conveyer 124 for moving the product into a chest 126 which holds and heats the product. A water induction system 128 may also be included to adjusting the moisture content of the product in the chest.

The flaking system 120 may also include a steam generator 130. The steam generator 130 may be connected to a steam line 134 which is connected to a plurality of valves 136 for introducing steam into the chest 126. Disposed along the steam line 134 is an additive pump 140 which is connected to an additive reservoir by a feed line 144. The additive pump 140 is connected by to the steam line 134 by an additive feed line 148.

When the product in the chest is heated to a desired temperature, the product is passed through a plurality of rollers 150 which mash the product into flakes. The flakes are deposited on a conveyer 154 and taken to a dryer to get the flakes to a desired moisture content prior to packaging.

Many crops have been genetically modified or hybridized to resist pests and various environmental conditions, such as drought. For example, many types of corn now include a waxy coating which inhibit insect infestations. This coating, however, tends to stick to the rollers 150 and can clog up the system. In an attempt to prevent such sticking, the water supply 128 in many current systems uses an acidic additive added thereto to help break down the coating while the feedstock is being heated. The presence of the acid water, however, can have detrimental effects on the rollers 150, the valves in the chest 126, and other components.

In the present invention, the additive is added to the steam line 134 while the feedstock is being heated. In addition to helping address waxy coatings, etc., it has been found that the additive of the present invention allows the feedstock to be processed at a higher temperature. For example, corn is usually heated to 175-180 degrees Fahrenheit and then run through the rollers. Higher temperatures have been problematic because the corn wills stick to the rollers 150 and clog up the system. In accordance with the present invention, it has been found that corn can be run between 205 and 230 degrees, with the additive decreasing sticking to the rollers to acceptable levels. It is anticipated that the system will also last longer, as the components are not being subjected to acidic water during the process.

Figure 6:
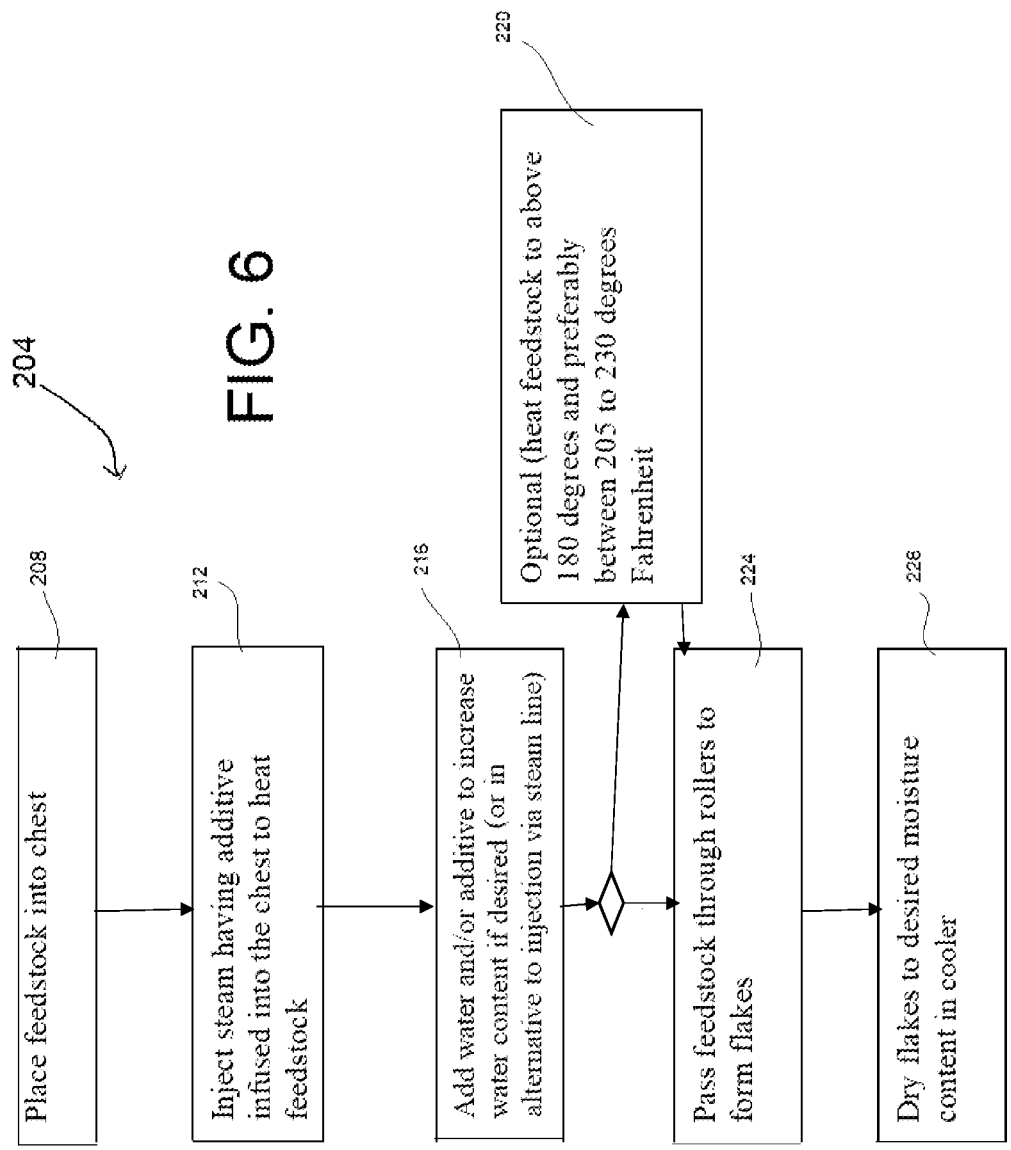
FIG. 6 shows a flowchart of a representative example of the method of making flakes in accordance with the present invention.

Turning now to FIG. 6, there is shown a diagram of the process, generally indicated at 204, of making flakes. The feedstock (which may be corn, rice or any other plan material which is to be flaked) is fed into the chest, as indicated at 208. Steam is injected into the chest to heat the feed stock, as indicated at 212. In accordance with the present invention, the steam includes an additive. The additive is preferably added to the steam just prior to injection and after any water traps placed along the steam line.

Water may be added if needed to the feedstock to achieve a desired moisture content for mashing the feedstock through the rollers, as indicated at 216. In accordance with one aspect of the present invention, the feedstock can be heated to a temperature which is 5% to 40% higher than the normal temperature at which the feed stock is passed through the rollers. Thus, for example, corn can be heated to between 205 to 230 degrees, as indicated at 220, prior to being passed through the rollers, while conventional processing heated the corn to 175 to 180 degrees to minimize sticking of the corn to the rollers.

The feedstock is then passed through the rollers or other mashing device, as indicated at 224, and then passed to a dryer, as indicated at 228, for drying to a desired moisture content.

EXAMPLES

The following are examples of formulations made in accordance with the present invention compared to a control in which the material was processed (either feedstock formed into pellets or corn flaked) in three ways for comparison: (1) using the prior art additive from Save Our Earth (acquired from Save Our Earth Solutions, LLC, 17443 Energy Ln, Dallas, Tex. 75252-6188); (2) using the present disclosure's additive formula; and (3) without the addition of an additive as a control. Once the conditioning chamber was heated to a conventional temperature for processing the pellets consistent with the control group, the Save our Earth additive and the additive of the present invention where introduced until the amperage on the pelletizing equipment began to decrease. The heat in the conditioning chamber was then gradually increased until the amperage draw on the pelletizing equipment plateaued. The temperature in the pelletizing equipment was then held steady as long as the amperage remained consistent.

For each example according to the prior art method, approximately 3 ounces of the Save Our Earth additive was added per ton of feedstock. Additional amounts were required (up to 6 ounces) because it was found the Save Our Earth additive was more dilute compared to the additive of the present disclosure.

For each example according to the present disclosure, approximately 1 ounce of the present disclosure's additive was added per ton of feedstock. For each example, the following specific formula of the present disclosure (referred to below as the "Global Earth Solutions" formula) was used to make a 275 gallon (total weight of about 2,548.7 pounds) batch of additive:

110 gallons glycerin (about 1158.3 pounds)

2 lbs Guar Gum 4 lbs Arabic Gum 5 lbs aloe vera powder

Remainder: Heated Reverse Osmosis Water (about 1,379.4 pounds)

Example 1—Wood Pellets

The wood used as feedstock for wood pellets is generally a mix of soft woods like pine and hardwoods such as oak, fir and alder. The mix will vary depending on the location of the mill and the woods available. Softer wood pellets are generally used for bedding and the hardwoods are used for burning. The amount of SOES used was 6 ounces per ton of wood feedstock.

The amount of additive used was 2 ounces per ton of feedstock for the Global Earth Solutions additive.

| Trial 1, Mixed Wood Feedstock. | | | |
| --- | --- | --- | --- |
| ADDITIVE: Save Our Earth Solutions - SOES | | | |
| Run Time of Product (in Mins) | Operating Temperature | Energy Draw (in amps) | Throughput (in tons/hr.) |
| 15 | 125 F. | 152 | 2.2 |
| 30 | 130 F. | 144 | 3 |
| 45 | 130 F. | 144 | 3 |
| 60 | 130 F. | 144 | 3 |
| 75 | 130 F. | 144 | 3 |
| 90 | 130 F. | 144 | 3 |
| PDI (after 90 mins): | 88 | | |
| Run Time of Product (in Mins) | Operating Temperature | Energy Draw (in amps) | Throughput (in tons) |
| ADDITIVE: Global Earth Solutions | | | |
| 15 | 135 | 148 | 2.8 |
| 30 | 148 | 140 | 3.4 |
| 45 | 158 | 125 | 4 |
| 60 | 164 | 122 | 4.8 |
| 75 | 164 | 122 | 4.8 |
| 90 | 164 | 122 | 4.8 |
| PDI (after 90 mins): | 95 | | |
| ADDITIVE: No Additive | | | |
| 15 | 110 | 158 | 2 |
| 30 | 110 | 158 | 2 |
| 45 | 110 | 158 | 2 |
| 60 | 110 | 158 | 2 |
| 75 | 110 | 158 | 2 |
| 90 | 110 | 158 | 2 |
| PDI (after 90 mins): | 87 | | |

| Trial 2, Mixed Wood Feedstock. | | | |
| --- | --- | --- | --- |
| Run Time of Product (in Mins) | Operating Temperature | Energy Draw (in amps) | Throughput (in tons) |
| ADDITIVE: Save Our Earth Solutions - SOES | | | |
| 15 | 135 | 150 | 4.2 |
| 30 | 140 | 149 | 4.2 |
| 45 | 145 | 147 | 4.3 |
| 60 | 145 | 147 | 4.3 |
| PDI (after 90 mins): | 87 | | |
| ADDITIVE: Global Earth | | | |
| 15 | 140 | 144 | 4.8 |
| 30 | 148 | 140 | 5.1 |
| 45 | 158 | 138 | 5.4 |
| 60 | 160 | 133 | 5.5 |
| PDI (after 90 mins): | 95 | | |
| Additive: No Additive | | | |
| 15 | 120 | 155 | 3.5 |
| PDI (after 90 mins): | 91 | | |

The formula in accordance with the present disclosure was a substantial improvement over the control and the Save our Earth Additive.

Example 2—Protein Pellets

The following is a comparison of a protein feedstock being pelletized (the protein feedstock may vary depending on the brand and location of the mill, but generally a 1600 pound batch of protein pellet feedstock consists of 1200 pounds of millrun mill, 300 pounds of soybean mill, and a 100 pound mineral pack). For each trial, 3 ounces of Save Our Earth Solution's additive was used per 1 ton of feedstock, and 1 ounce of the current disclosures ("Global Earth Solutions") was used per 1 ton of feedstock.

| Trial 1, Protein Pellet Feedstock. | | | |
| --- | --- | --- | --- |
| Run Time of Product (in Mins) | Operating Temperature | Energy Draw (in amps) | Throughput (in tons) |
| ADDITIVE: Save Our Earth Solutions - SOES | | | |
| 15 | 145 | 125 | 2.8 |
| 30 | 152 | 119 | 2.9 |
| 45 | 154 | 109 | 3 |
| 60 | 154 | 109 | 3 |
| 75 | 154 | 109 | 3 |
| 90 | 154 | 109 | 3 |
| PDI (after 90 mins): | 89 | | |
| ADDITIVE: Global Earth Solutions | | | |
| 15 | 168 | 90 | 4.8 |
| 30 | 171 | 90 | 5.2 |
| 45 | 171 | 85 | 5.6 |
| 60 | 175 | 75 | 5.8 |
| 75 | 175 | 75 | 5.8 |
| 90 | 175 | 75 | 5.8 |
| PDI (after 90 mins): | 94 | | |

| Trial 1, Protein Pellet Feedstock. | | | |
|---|---|---|---|
| Run Time of Product (in Mins) | Operating Temperature | Energy Draw (in amps) | Throughput (in tons) |
| ADDITIVE: No Additive | | | |
| 15 | 145 | 110 | 3 |
| 30 | 145 | 110 | 3 |
| 45 | 145 | 110 | 3 |
| 60 | 145 | 110 | 3 |
| 75 | 145 | 110 | 3 |
| 90 | 145 | 110 | 3 |
| PDI (after 90 mins): | 87 | | |

| Trial 2, Protein Pellet Feedstock. | | | |
|---|---|---|---|
| Run Time of Product (in Mins) | Operating Temperature | Energy Draw (in amps) | Throughput (in tons) |
| ADDITIVE: Save Our Earth Solutions | | | |
| 15 | 145 | 152 | 3.1 |
| 30 | 150 | 150 | 3.3 |
| 45 | 155 | 150 | 3.3 |
| 60 | 160 | 150 | 3.3 |
| 75 | 160 | 150 | 3.3 |
| 90 | 160 | 150 | 3.3 |
| PDI (after 90 mins): | 88 | | |
| ADDITIVE: Global Earth Solutions | | | |
| 15 | 155 | 142 | 3.9 |
| 30 | 165 | 135 | 4.8 |
| 45 | 175 | 120 | 5.4 |
| 60 | 185 | 115 | 6.1 |
| 75 | 185 | 115 | 6.1 |
| 90 | 185 | 115 | 6.1 |
| PDI (after 90 mins): | 94 | | |
| Additive: No Additive | | | |
| 15 | 145 | 152 | 3.1 |
| 30 | 145 | 152 | 3.1 |
| 45 | 145 | 152 | 3.1 |
| 60 | 145 | 152 | 3.1 |
| 75 | 145 | 152 | 3.1 |
| 90 | 145 | 152 | 3.1 |
| PDI (after 90 mins): | 91 | | |

| Trial 3, Protein Pellet Feedstock. | | | |
|---|---|---|---|
| Run Time of Product (in Mins) | Operating Temperature | Energy Draw (in amps) | Throughput (in tons) |
| ADDITIVE: Save Our Earth Solutions | | | |
| 15 | 140 | 152 | 3.1 |
| 30 | 145 | 150 | 3.3 |
| 45 | 150 | 150 | 3.3 |
| 60 | 155 | 148 | 3.4 |
| 75 | 155 | 148 | 3.4 |
| 90 | 155 | 148 | 3.4 |
| PDI (after 90 mins): | 89 | | |
| ADDITIVE: Global Earth Solutions | | | |
| 15 | 155 | 142 | 4.1 |
| 30 | 160 | 133 | 5.1 |
| 45 | 168 | 128 | 5.4 |
| 60 | 175 | 121 | 5.8 |
| 75 | 175 | 121 | 5.8 |
| 90 | 175 | 121 | 5.8 |
| PDI (after 90 mins): | 94 | | |

| Trial 3, Protein Pellet Feedstock. | | | |
|---|---|---|---|
| Run Time of Product (in Mins) | Operating Temperature | Energy Draw (in amps) | Throughput (in tons) |
| ADDITIVE: No Additive | | | |
| 15 | 140 | 152 | 3.1 |
| 30 | 140 | 152 | 3.1 |
| 45 | 140 | 152 | 3.1 |
| 60 | 140 | 152 | 3.1 |
| 75 | 140 | 152 | 3.1 |
| 90 | 140 | 152 | 3.1 |
| PDI (after 90 mins): | 89 | | |

| Trial 4, Protein Pellet Feedstock | | | |
|---|---|---|---|
| Run Time of Product (in Mins) | Operating Temperature | Energy Draw (in amps) | Throughput (in tons) |
| ADDITIVE: Save Our Earth Solutions - SOES | | | |
| 15 | 145 | 152 | 3.1 |
| 30 | 150 | 150 | 3.3 |
| 45 | 155 | 150 | 3.3 |
| 60 | 160 | 150 | 3.3 |
| 75 | 160 | 150 | 3.3 |
| 90 | 160 | 150 | 3.3 |
| PDI (after 90 mins): | 88 | | |
| ADDITIVE: Global Earth Solutions | | | |
| 15 | 155 | 142 | 3.9 |
| 30 | 165 | 135 | 4.8 |
| 45 | 175 | 120 | 5.4 |
| 60 | 185 | 115 | 6.1 |
| 75 | 185 | 115 | 6.1 |
| 90 | 185 | 115 | 6.1 |
| PDI (after 90 mins): | 94 | | |
| PRODUCT: No Product | | | |
| 15 | 145 | 152 | 3.1 |
| 30 | 145 | 152 | 3.1 |
| 45 | 145 | 152 | 3.1 |
| 60 | 145 | 152 | 3.1 |
| 75 | 145 | 152 | 3.1 |
| 90 | 145 | 152 | 3.1 |
| PDI (after 90 mins): | 86 | | |

Example 4—Flaking Corn

The following is a comparison between a currently available additive, the additive of the present invention, and no additive in a flaking process. The feedstock used was corn for each of the trials. Approximately 3 ounces of the Save Our Earth Solutions was added per ton of corn feedstock, and approximately 1 ounce of the formula according to the present invention (Global Earth Solutions) was added per ton of feedstock.

| Trial 1, Flaking Corn Feedstock. | | | |
|---|---|---|---|
| Run Time of Product (in Mins) | Operating Temperature | Energy Draw (in amps) | Throughput (in tons/hr.) |
| ADDITIVE: Save Our Earth Solutions - SOES | | | |
| 15 | 190 | 151 | 4.8 |
| 30 | 195 | 150 | 4.9 |
| 45 | 195 | 150 | 4.9 |
| 60 | 195 | 150 | 4.9 |

-continued

Trial 1, Flaking Corn Feedstock.

| Run Time of Product (in Mins) | Operating Temperature | Energy Draw (in amps) | Throughput (in tons/hr.) |
|---|---|---|---|
| 75 | 195 | 150 | 4.9 |
| 90 | 195 | 150 | 4.9 |
| Glucose Content (after 90 mins): | 925 | | |
| ADDITIVE: Global Earth Solutions | | | |
| 15 | 200 | 144 | 5.5 |
| 30 | 205 | 140 | 5.7 |
| 45 | 210 | 135 | 6.2 |
| 60 | 215 | 134 | 6.6 |
| 75 | 215 | 134 | 6.6 |
| 90 | 215 | 134 | 6.6 |
| Glucose Content (after 90 mins): | 1035 | | |
| ADDITIVE: No Additive | | | |
| 15 | 190 | 151 | 4.8 |
| 30 | 190 | 151 | 4.8 |
| 45 | 190 | 151 | 4.8 |
| 60 | 190 | 151 | 4.8 |
| 75 | 190 | 151 | 4.8 |
| 90 | 190 | 151 | 4.8 |
| Glucose Content (after 90 mins): | 965 | | |

Trial 2, Flaking Corn Feedstock.

| Run Time of Product (in Mins) | Operating Temperature | Energy Draw (in amps) | Throughput (in tons) |
|---|---|---|---|
| ADDITIVE: Save Our Earth Solutions - SOES | | | |
| 15 | 195 | 155 | 4.9 |
| 30 | 200 | 155 | 5 |
| 45 | 205 | 150 | 5.4 |
| 60 | 205 | 150 | 5.4 |
| 75 | 210 | 148 | 5.6 |
| 90 | 215 | 148 | 5.6 |
| Glucose Content (after 90 mins): | No data | | |
| ADDITIVE: Global Earth Solutions | | | |
| 15 | 200 | 150 | 5 |
| 30 | 215 | 145 | 5.6 |
| 45 | 210 | 140 | 5.8 |
| 60 | 222 | 138 | 6.5 |
| 75 | 224 | 135 | 7 |
| 90 | 224 | 135 | 7.5 |
| Glucose Content (after 90 mins): | 1038 | | |
| PRODUCT: No Product | | | |
| 15 | 200 | 155 | 4.9 |
| 30 | 200 | 155 | 4.9 |
| 45 | 200 | 155 | 4.9 |
| 60 | 200 | 155 | 4.9 |
| 75 | 200 | 155 | 4.9 |
| 90 | 200 | 155 | 4.9 |
| Glucose Content (after 90 mins): | No data | | |

Trial 3, Flaking Corn Feedstock.

| Run Time of Product (in Mins) | Operating Temperature | Energy Draw (in amps) | Throughput (in tons) |
|---|---|---|---|
| ADDITIVE: Save Our Earth Solutions | | | |
| 15 | 190 | 151 | 4.8 |
| 30 | 195 | 150 | 4.9 |
| 45 | 195 | 150 | 4.9 |
| 60 | 195 | 150 | 4.9 |
| 75 | 195 | 150 | 4.9 |
| 90 | 195 | 150 | 4.9 |
| Glucose Content (after 90 mins): | 910 | | |
| ADDITIVE: Global Earth Solutions | | | |
| 15 | 200 | 144 | 5.5 |
| 30 | 205 | 140 | 5.7 |
| 45 | 210 | 135 | 6.2 |
| 60 | 215 | 134 | 6.6 |
| 75 | 215 | 134 | 6.6 |
| 90 | 215 | 134 | 6.6 |
| Glucose Content (after 90 mins): | 1035 | | |
| ADDITIVE: No Additive | | | |
| 15 | 190 | 151 | 4.8 |
| 30 | 190 | 151 | 4.8 |
| 45 | 190 | 151 | 4.8 |
| 60 | 190 | 151 | 4.8 |
| Glucose Content (after 90 mins): | No Data | | |

Trial 4, Flaking Corn Feedstock.

| Run Time of Product (in Mins) | Operating Temperature | Energy Draw (in amps) | Throughput (in tons) |
|---|---|---|---|
| ADDITIVE: Save Our Earth Solutions | | | |
| 15 | 195 | 155 | 4.9 |
| 30 | 200 | 155 | 5 |
| 45 | 205 | 150 | 5.4 |
| 60 | 205 | 150 | 5.4 |
| 75 | 210 | 148 | 5.6 |
| 90 | 215 | 148 | 5.6 |
| Glucose Content (after 90 mins): | 895 | | |
| ADDITIVE: Global Earth Solutions | | | |
| 15 | 200 | 150 | 5 |
| 30 | 215 | 145 | 5.6 |
| 45 | 210 | 140 | 5.8 |
| 60 | 222 | 138 | 6.5 |
| 75 | 224 | 135 | 7 |
| 90 | 224 | 135 | 7.5 |
| Glucose Content (after 90 mins): | 1038 | | |
| ADDITIVE: No Additive | | | |
| 15 | 200 | 155 | 4.9 |
| 30 | 200 | 155 | 4.9 |
| 45 | 200 | 155 | 4.9 |
| 60 | 200 | 155 | 4.9 |
| 75 | 200 | 155 | 4.9 |
| 90 | 200 | 155 | 4.9 |
| Glucose Content (after 90 mins): | 920 | | |

| Trial 5, Flaking Corn Feedstock. | | | |
|---|---|---|---|
| Run Time of Product (in Mins) | Operating Temperature | Energy Draw (in amps) | Throughput (in tons) |
| ADDITIVE: Save Our Earth Solutions | | | |
| 15 | 185 | 158 | 5 |
| 30 | 190 | 155 | 5.3 |
| 45 | 195 | 155 | 5.3 |
| 60 | 200 | 152 | 5.8 |
| 75 | 200 | 150 | 5.8 |
| 90 | 200 | 150 | 5.9 |
| Glucose Content (after 90 mins): | 891 | | |
| ADDITIVE: Global Earth Solutions | | | |
| 15 | 190 | 155 | 5 |
| 30 | 195 | 148 | 5.6 |
| 45 | 205 | 140 | 5.8 |
| 60 | 215 | 138 | 6.6 |
| 75 | 218 | 130 | 6.9 |
| 90 | 218 | 130 | 7 |
| Glucose Content (after 90 mins): | 1010 | | |
| ADDITIVE: No Additive | | | |
| 15 | 195 | 155 | 5 |
| 30 | 195 | 155 | 5 |
| 45 | 195 | 155 | 5 |
| 60 | 195 | 155 | 5 |
| 75 | 195 | 155 | 5 |
| 90 | 195 | 155 | 5 |
| Glucose Content (after 90 mins): | 890 | | |

| Trial 6, Flaking Corn Feedstock. | | | |
|---|---|---|---|
| Run Time of Product (in Mins) | Operating Temperature | Energy Draw (in amps) | Throughput (in tons) |
| ADDITIVE: Save Our Earth Solutions | | | |
| 15 | 185 | 135 | 4 |
| 30 | 188 | 134 | 4 |
| 45 | 190 | 132 | 4.1 |
| 60 | 190 | 132 | 4.1 |
| 75 | 190 | 132 | 4.1 |
| 90 | 190 | 132 | 4.1 |
| Glucose Content (after 90 mins): | 842 | | |
| ADDITIVE: Global Earth Solutions | | | |
| 15 | 190 | 130 | 5 |
| 30 | 199 | 125 | 5.5 |
| 45 | 205 | 120 | 6.1 |
| 60 | 210 | 117 | 6.4 |
| 75 | 210 | 117 | 6.4 |
| 90 | 210 | 117 | 6.4 |
| Glucose Content (after 90 mins): | 1005 | | |

Example 5—Chicken Manure

The following is a comparison between a currently available additive, the additive of the present invention, and no additive used in pelletizing chicken manure. The feedstock used was chicken manure (organic). Approximately 6 ounces of the Save Our Earth Solutions was added per ton of chicken manure feedstock, and approximately 2 ounces of the formula according to the present invention (Global Earth Solutions) was added per ton of chicken manure feedstock.

| Trial 1, Chicken Manure Feedstock. | | | |
|---|---|---|---|
| Run Time of Product (in Mins) | Operating Temperature | Energy Draw (in amps) | Throughput (in tons) |
| ADDITIVE: Save Our Earth Solutions | | | |
| 15 | 145 | 175 | 9 |
| 30 | 155 | 170 | 9.8 |
| 45 | 165 | 166 | 10.2 |
| 60 | 170 | 164 | 10.2 |
| 75 | 175 | 161 | 10.2 |
| 90 | 175 | 161 | 10.2 |
| Glucose Content (after 90 mins): | | | |
| PDI (after 90 mins): | 91 | | |
| ADDITIVE: Global Earth Solutions | | | |
| 15 | 160 | 155 | 10 |
| 30 | 175 | 145 | 12 |
| 45 | 185 | 135 | 15 |
| 60 | | | |
| 75 | | | |
| 90 | | | |
| PDI (after 90 mins): | 96 | | |
| PRODUCT: No Product | | | |
| 15 | 145 | 170 | 9 |
| 30 | 145 | 170 | 9 |
| 45 | 145 | 170 | 9 |
| 60 | 145 | 170 | 9 |
| 75 | 145 | 170 | 9 |
| 90 | 145 | 170 | 9 |
| PDI (after 90 mins): | 90 | | |

| Trial 2, Chicken Manure Feedstock. | | | |
|---|---|---|---|
| Run Time of Product (in Mins) | Operating Temperature | Energy Draw (in amps) | Throughput (in tons) |
| ADDITIVE: Save Our Earth Solutions | | | |
| 15 | 175 | 200 | 2.5 |
| 30 | 180 | 200 | 2.9 |
| 45 | 185 | 198 | 2.9 |
| 60 | 188 | 196 | 3 |
| 75 | 189 | 196 | 3 |
| 90 | 191 | 195 | 3.2 |
| PDI (after 90 mins): | 86 | | |
| ADDITIVE: Global Earth Solutions | | | |
| 15 | 190 | 205 | 4 |
| 30 | 195 | 200 | 4.4 |
| 45 | 200 | 195 | 4.5 |
| 60 | 210 | 191 | 4.9 |
| 75 | 215 | 190 | 5.5 |
| 90 | 215 | 185 | 6 |
| PDI (after 90 mins): | 94.1 | | |
| ADDITIVE: No Additive | | | |
| 15 | 195 | 185 | 4 |
| 30 | 195 | 185 | 4 |
| 45 | 195 | 185 | 4 |
| 60 | 195 | 185 | 4 |
| 75 | 195 | 185 | 4 |
| 90 | 195 | 185 | 4 |
| PDI (after 90 mins): | 89 | | |

Example 6—Hay/Alfalfa Pellets

The following is a comparison between a currently available additive, the additive of the present invention, and no additive used in pelletizing hay/alfalfa. The feedstock used depends on the location of the mill, but generally comprises alfalfa, timothy grass, and/or Bermuda grass. Approximately 4 ounces of the Save Our Earth Solutions was added per ton of chicken manure feedstock, and approximately 1 ounce of the formula according to the present invention (Global Earth Solutions) was added per ton of hay/alfalfa feedstock.

| Run Time of Product (in Mins) | Operating Temperature | Energy Draw (in amps) | Throughput (in tons) |
|---|---|---|---|
| ADDITIVE: Save Our Earth Solutions | | | |
| 15 | 155 | 180 | 3.8 |
| 30 | 160 | 176 | 4 |
| 45 | 163 | 170 | 4.2 |
| 60 | 168 | 170 | 4.2 |
| 75 | 170 | 168 | 4.3 |
| 90 | 170 | 168 | 4.3 |
| PDI (after 90 mins): | 88 | | |
| ADDITIVE: Global Earth Solutions | | | |
| 15 | 170 | 160 | 4.4 |
| 30 | 180 | 155 | 4.6 |
| 45 | 185 | 150 | 5.5 |
| 60 | 187 | 141 | 6.2 |
| 75 | 187 | 141 | 6.2 |
| 90 | 187 | 141 | 6.2 |
| PDI (after 90 mins): | 95 | | |
| ADDITIVE: No Additive | | | |
| 15 | 145 | 180 | 3.8 |
| 30 | 145 | 180 | 3.8 |
| 45 | 145 | 180 | 3.8 |
| 60 | 145 | 180 | 3.8 |
| 75 | 145 | 180 | 3.8 |
| 90 | 145 | 180 | 3.8 |
| PDI (after 90 mins): | 87 | | |

Example 7—Mineral Pellets

The following is a comparison between a currently available additive, the additive of the present invention, and no additive used in forming a mineral pellet. The mineral blend used as feedstock for the mineral pellet depends on the location of the mill, and in the present case a proprietary feedstock from J. D. Heiskell (Colorado) was used. Approximately 3 ounces of the Save Our Earth Solutions was added per ton of mineral feedstock, and approximately 1 ounce of the formula according to the present invention (Global Earth Solutions) was added per ton of mineral feedstock.

| Trial 1. Mineral Pellets | | | |
|---|---|---|---|
| Run Time of Product (in Mins) | Operating Temperature | Energy Draw (in amps) | Throughput (in tons) |
| ADDITIVE: Save Our Earth Solutions | | | |
| 15 | 180 | 205 | 3.2 |
| 30 | 188 | 200 | 3.6 |
| 45 | 188 | 198 | 4 |
| 60 | 188 | 195 | 4 |
| 75 | 188 | 195 | 4 |
| 90 | 188 | 195 | 4 |
| PDI (after 90 mins): | 89 | | |
| ADDITIVE: Global Earth Solutions | | | |
| 15 | 180 | 195 | 3.3 |
| 30 | 188 | 180 | 4.8 |
| 45 | 195 | 180 | 4.8 |
| 60 | 200 | 172 | 5.6 |
| 75 | 205 | 163 | 5.6 |
| 90 | 209 | 161 | 6.1 |
| PDI (after 90 mins): | 96 | | |
| ADDITIVE: No Additive | | | |
| 15 | 175 | 205 | 2.2 |
| 30 | 180 | 195 | 2.8 |
| 45 | 180 | 195 | 2.8 |
| 60 | 180 | 195 | 2.8 |
| 75 | 180 | 195 | 2.8 |
| 90 | 180 | 195 | 2.8 |
| PDI (after 90 mins): | 86 | | |

Thus there is disclosed an additive system and methods of using the same. It will be appreciated that numerous modifications may be made without departing from the scope and spirit of this disclosure. The appended claims are intended to cover such modifications.

What is claimed is:

1. A system for pelletizing or flaking a feedstock, the system comprising:
   a lubricant comprising about 25-80% by weight glycerin;
   between about 0.1% and 4% by weight wheat grass rice solution; and
   about 20-75% by weight water, wherein the water has been subjected to reverse osmosis to remove minerals;
   a conditioning chamber;
   a stream line in communication with the conditioning chamber to heat the feedstock within the conditioning chamber; and
   a lubricant injection system in communication with the steam line to introduce the lubricant into the feedstock within the conditioning chamber in an amount of about one ounce to about four ounces of lubricant per ton of the feedstock.

2. The system of claim 1, the lubricant comprising fruit juice in an amount between about 0.1% and 4% by weight of the lubricant, and wherein the water has been subjected to reverse osmosis at 100 degrees Fahrenheit.

3. The system of claim 2, wherein the fruit juice is fruit juice concentrate in an amount between about 0.1% and 2% by weight of the lubricant.

4. The system of claim 2, wherein the fruit juice comprises at least one of orange juice, apple juice and pomegranate juice.

5. The system of claim 1, the lubricant comprising between about 0.1% and 5% by weight sugar cane extract.

6. The system of claim 1, the lubricant comprising between about 0.1% and 2% by weight organic vinegar.

7. The system of claim 1, the lubricant further comprising about 0.05 to about 0.1 percent by weight guar gum.

8. The system of claim 1, the lubricant further comprising about 0.1 to about 0.2 percent by weight Arabic gum.

9. The system of claim 1, the lubricant further comprising about 0.15 to about 0.25 percent by weight aloe vera powder.

10. A system for use in pelletizing or flaking a feedstock, the system comprising:
    a lubricant, the lubricant comprising about 25-80% by weight glycerin;
    between about 0.1% and 4% by weight wheat grass rice solution; and about 20-75% by weight water, wherein the water has been subjected to reverse osmosis to remove minerals;

a conditioning chamber in communication with a steam line, the lubricant introduceable into the steam line in an amount of about 1 ounce to about 3 ounces of lubricant per ton of the feedstock.

11. The system of claim 10, the lubricant further comprising about 0.05 to about 0.1 percent by weight guar gum.

12. The system of claim 10, the lubricant further comprising about 0.1 to about 0.2 percent by weight Arabic gum.

13. The system of claim 10, the lubricant further comprising about 0.15 to about 0.25 percent by weight aloe vera powder.

14. A method for pelletizing a feedstock, the method comprising:

mixing about 20-75% by weight reverse osmosis water with about 25-80% by weight glycerin, wherein the water has been subjected to reverse osmosis at at least 100 degrees Fahrenheit, and adding between 0.00001 and 0.001 percent by weight organic wheat grass rice solution to form a lubricant; and adding about 1 ounce to about 3 ounces of the lubricant per ton of the feedstock to a steam line in communication with a conditioning chamber.

15. The method of claim 14, wherein the method further comprises adding between 0.0001 and 0.01 percent by weight gum to the lubricant.

16. The method of claim 14, wherein the method further comprises adding between 0.1% and 4% by weight fruit juice to the lubricant.

* * * * *